United States Patent
Tomokiyo et al.

(10) Patent No.: US 10,061,438 B2
(45) Date of Patent: Aug. 28, 2018

(54) INFORMATION PROCESSING APPARATUS, INFORMATION PROCESSING METHOD, AND PROGRAM

(71) Applicant: SONY CORPORATION, Tokyo (JP)

(72) Inventors: Tsutomu Tomokiyo, Kanagawa (JP); Kazumichi Shirai, Tokyo (JP); Hiroyuki Kaneko, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/308,388

(22) PCT Filed: Feb. 18, 2015

(86) PCT No.: PCT/JP2015/054394
§ 371 (c)(1),
(2) Date: Nov. 2, 2016

(87) PCT Pub. No.: WO2015/174110
PCT Pub. Date: Nov. 19, 2015

(65) Prior Publication Data
US 2017/0068389 A1 Mar. 9, 2017

(30) Foreign Application Priority Data
May 14, 2014 (JP) .................. 2014-100647

(51) Int. Cl.
*G06F 3/041* (2006.01)
*G06F 3/0488* (2013.01)

(52) U.S. Cl.
CPC ............ *G06F 3/0418* (2013.01); *G06F 3/041* (2013.01); *G06F 3/0488* (2013.01); *G06F 3/04883* (2013.01); *G06F 2203/04808* (2013.01)

(58) Field of Classification Search
CPC ...... G06F 3/0418; G06F 3/041; G06F 3/0488; G06F 3/04883; G06F 3/042; G06F 3/043;
(Continued)

(56) References Cited

U.S. PATENT DOCUMENTS 8,577,644 B1 * 11/2013 Ksondzyk ............. G06F 3/0414
345/173
9,535,598 B2 * 1/2017 Rimon .................... G06F 3/038
(Continued)

FOREIGN PATENT DOCUMENTS

| JP | 2013-239019 A | 11/2013 |
| WO | 2013/128911 A1 | 9/2013 |
| WO | 2013/190857 A1 | 12/2013 |

OTHER PUBLICATIONS

Extended European Search Report in EP 15793451.4 dated Dec. 4, 2017.

*Primary Examiner* — Tom Sheng
(74) *Attorney, Agent, or Firm* — Chip Law Group

(57) ABSTRACT

To improve determination accuracy for validity of input performed through operation with respect to an operation surface.

An information processing apparatus includes an operation detecting unit configured to detect a contact area where each of one or two or more objects contacting an operation surface contacts the operation surface, a determining unit configured to determine contact between the object and the operation surface as valid input or invalid input based on comparison between the contact area and a threshold, and a threshold setting unit configured to dynamically set the threshold.

9 Claims, 7 Drawing Sheets

(58) Field of Classification Search
CPC .......... G06F 3/044; G06F 3/045; G06F 3/046; G06F 3/047; G06F 2203/04808
See application file for complete search history.

(56) References Cited

U.S. PATENT DOCUMENTS

| | | | | |
|---|---|---|---|---|
| 2006/0284858 A1* | 12/2006 | Rekimoto | ............... | G06F 3/033 345/173 |
| 2009/0095540 A1 | 4/2009 | Zachut et al. | | |
| 2011/0291944 A1 | 12/2011 | Simmons et al. | | |
| 2012/0299856 A1* | 11/2012 | Hasui | ................... | G06F 3/0418 345/173 |
| 2013/0068016 A1* | 3/2013 | Chen | ....................... | G06F 3/044 73/488 |
| 2013/0169565 A1* | 7/2013 | Funahashi | ........... | G06F 3/04883 345/173 |
| 2013/0300696 A1* | 11/2013 | Haran | ..................... | G06F 3/041 345/173 |
| 2014/0002407 A1* | 1/2014 | Badaye | ................. | G06F 3/0416 345/174 |
| 2014/0078078 A1* | 3/2014 | Lee | ....................... | G06F 3/0488 345/173 |
| 2014/0111472 A1* | 4/2014 | Lee | ......................... | G06F 3/041 345/174 |
| 2014/0354553 A1* | 12/2014 | Dai | ....................... | G06F 3/0416 345/173 |
| 2014/0354584 A1* | 12/2014 | Cok | ...................... | G06F 3/0414 345/174 |
| 2015/0029139 A1* | 1/2015 | Oshita | .................... | G06F 3/044 345/174 |
| 2015/0099563 A1* | 4/2015 | Yang | .................... | G06F 3/0488 455/566 |
| 2015/0160778 A1* | 6/2015 | Kim | ...................... | G06F 3/044 345/174 |
| 2015/0193037 A1* | 7/2015 | Masaki | ............... | G06F 3/03545 345/173 |

* cited by examiner

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2015/054394 filed on Feb. 18, 2015, which claims priority benefit of Japanese Patent Application No. JP 2014-100647 filed in the Japan Patent Office on May 14, 2014. Each of the above-referenced applications is hereby incorporated herein by reference in its entirety.

TECHNICAL FIELD

The present disclosure relates to an information processing apparatus, an information processing method, and a program.

BACKGROUND ART

Recently, as an input apparatus for detecting user operation, an information processing apparatus provided with a touch panel is widely spread. Because the touch panel is disposed while being laminated on a display, a user can intuitively select an item displayed on the display.

Further, as operation performed with respect to the touch panel, gesture input using multi-touch is also known. For example, the user can perform zoom gesture such as pinch-in which is gesture of narrowing an interval between two fingers touched on the touch panel, and pinch-out which is gesture of expanding an interval between the two fingers. Typically, the pinch-in is associated with a display demagnifying function of the display, and the pinch-out is associated with a display magnifying function of the display. Note that such gesture input with respect to the touch panel is disclosed in, for example, the following Patent Literature 1.

CITATION LIST

Patent Literature

Patent Literature 1: JP 2013-239019A

SUMMARY OF INVENTION

Technical Problem

By the way, it is assumed that operation with respect to a touch panel is performed using a specific object such as a finger or a stylus. An information processing apparatus may have a threshold for determining validity of input to prevent contact of an object other than such a specific object to the touch panel from being erroneously recognized as input by a user. For example, when a contact area where an object contacts the touch panel is less than or equal to the above-described threshold, the information processing apparatus can determine the contact of the object as valid input, while, when a contact area where an object contacts the touch panel exceeds the above-described threshold, the information processing apparatus can determine the contact of the object as invalid input.

Here, the present inventors confirmed that a contact area where an object contacts the touch panel differs according to operation content. For example, operation such as pinch-in and pinch-out tends to be performed while fingers are nearly horizontal with respect to the display, compared to tap operation for selecting a display item on the display with one finger. Therefore, a contact area upon operation such as pinch-in and pinch-out can be wider than a contact area upon tap operation.

However, the above-described threshold is a parameter which is fixedly set. Therefore, it is difficult to accurately determine validity of input. For example, when an area equivalent to a contact area upon tap operation is fixedly set, operation such as pinch-in and pinch-out is determined as invalid input. On the other hand, when the threshold is increased to an area equivalent to a contact area upon pinch-in and pinch-out, contact of an object other than a finger or a stylus is more likely to be determined as valid input.

Therefore, the present disclosure proposes new and improved information processing apparatus, information processing method and program which can improve determination accuracy for validity of input.

Solution to Problem

According to the present disclosure, there is provided an information processing apparatus including an operation detecting unit configured to detect a contact area where each of one or two or more objects contacting an operation surface contacts the operation surface, a determining unit configured to determine contact between the object and the operation surface as valid input or invalid input based on comparison between the contact area and a threshold, and a threshold setting unit configured to dynamically set the threshold.

According to the present disclosure, there is provided an information processing method including detecting a contact area where each of one or two or more objects contacting an operation surface contacts the operation surface, determining by a processor contact between the object and the operation surface as valid input or invalid input based on comparison between the contact area and a threshold, and dynamically setting the threshold.

According to the present disclosure, there is provided a program causing a computer to execute detecting a contact area where each of one or two or more objects contacting an operation surface contacts the operation surface, determining contact between the object and the operation surface as valid input or invalid input based on comparison between the contact area and a threshold, and dynamically setting the threshold.

Advantageous Effects of Invention

As described above, according to the present disclosure, it is possible to improve determination accuracy for validity of input. Note that the effects described above are not necessarily limitative. With or in the place of the above effects, there may be achieved any one of the effects described in this specification or other effects that may be grasped from this specification.

DESCRIPTION OF EMBODIMENT

Figure 1:
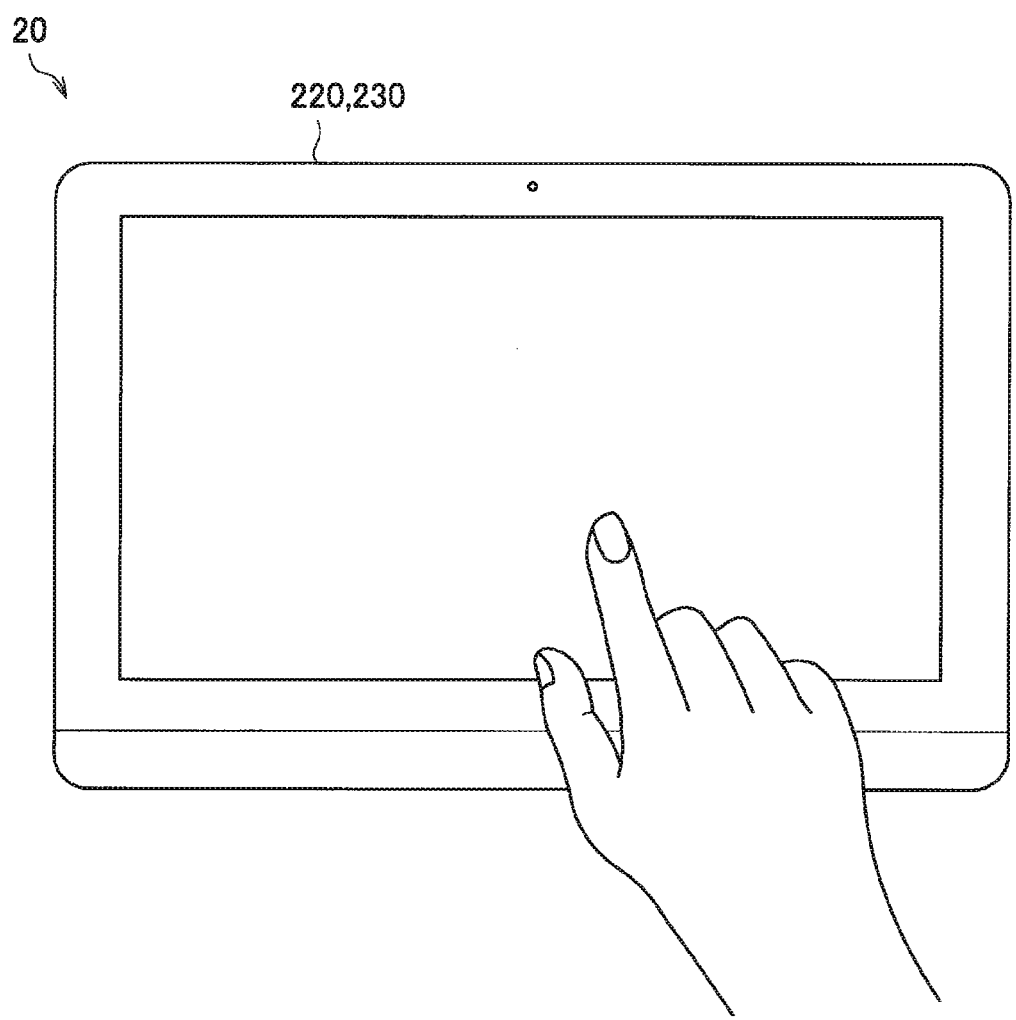
FIG. 1 is an explanatory diagram illustrating an information processing apparatus 20 according to an embodiment of the present disclosure.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, the present disclosure will be described according to the following item order.
1. Outline of information processing apparatus
2. Functions of information processing apparatus
3. Threshold setting method
3-1. First setting method
3-2. Second setting method
3-3. Third setting method
4. Hardware configuration
5. Conclusion 1. Outline of Information Processing Apparatus As one embodiment, a technology according to the present disclosure can be applied to an information processing apparatus which determines validity of operation with respect to an operation surface. First, outline of the information processing apparatus according to an embodiment of the present disclosure will be described below with reference to FIG. 1.

FIG. 1 is an explanatory diagram illustrating an information processing apparatus 20 according to the embodiment of the present disclosure. As illustrated in FIG. 1, the information processing apparatus 20 has a touch panel 220 and a display 230. The touch panel 220 is an operation detecting unit which detects, for example, contact of a finger of a user to an operation surface. A detection scheme for the touch panel 220 can include various schemes such as a resistive film scheme, an electrostatic capacitance scheme and a surface type electrostatic capacitance scheme.

Note that, when a surface of the touch panel 220 forms part of an outer surface of the information processing apparatus 20, the surface of the touch panel 220 corresponds to the operation surface. Meanwhile, when another layer (such as, for example, an antireflection film and a specific frequency light cut film) laminated on the touch panel 220 forms part of the outer surface of the information processing apparatus 20, the another layer corresponds to the operation surface, The display 230 has a function of displaying various kinds of screens. The display 230 may be a liquid crystal display or an organic electro luminescence (EL).

At the information processing apparatus 20, the above-described touch panel 220 and the display 230 are laminated. Therefore, when the user taps an object displayed on the display 230 with a finger as illustrated in FIG. 1, a tapped position is detected by the touch panel 220, and selection of the object corresponding to the tapped position is recognized inside the information processing apparatus 20.

Further, the touch panel 220 according to the embodiment of the present disclosure also addresses multi-touch. For example, the touch panel 220 can detect zoom gesture such as pinch-in which is gesture of narrowing an interval between two fingers which touch the operation surface and pinch-out which is gesture of expanding an interval between two fingers. When the touch panel 220 detects pinch-in, the display 230 demagnifies the display screen, while, when the touch panel 220 detects pinch-out, the display 230 magnifies the display screen.

Note that, in FIG. 1, while a tablet terminal is illustrated as one example of the information processing apparatus 20, the information processing apparatus 20 is not limited to a tablet terminal. For example, the information processing apparatus 20 may be user equipment such as a note-type personal computer (PC), mobile game equipment, a music reproduction apparatus, a video reproduction apparatus, a smartphone and a mobile phone. Further, the information processing apparatus 20 may be a stationary apparatus such as automated teller machine of a finance institution and a guiding apparatus provided at various kinds of facility.

2. Functions of Information Processing Apparatus

The outline of the information processing apparatus 20 according to the embodiment of the present disclosure has been described above. Subsequently, functions of the information processing apparatus 20 according to the embodiment of the present disclosure will be described with reference to FIG. 2.

Figure 2:
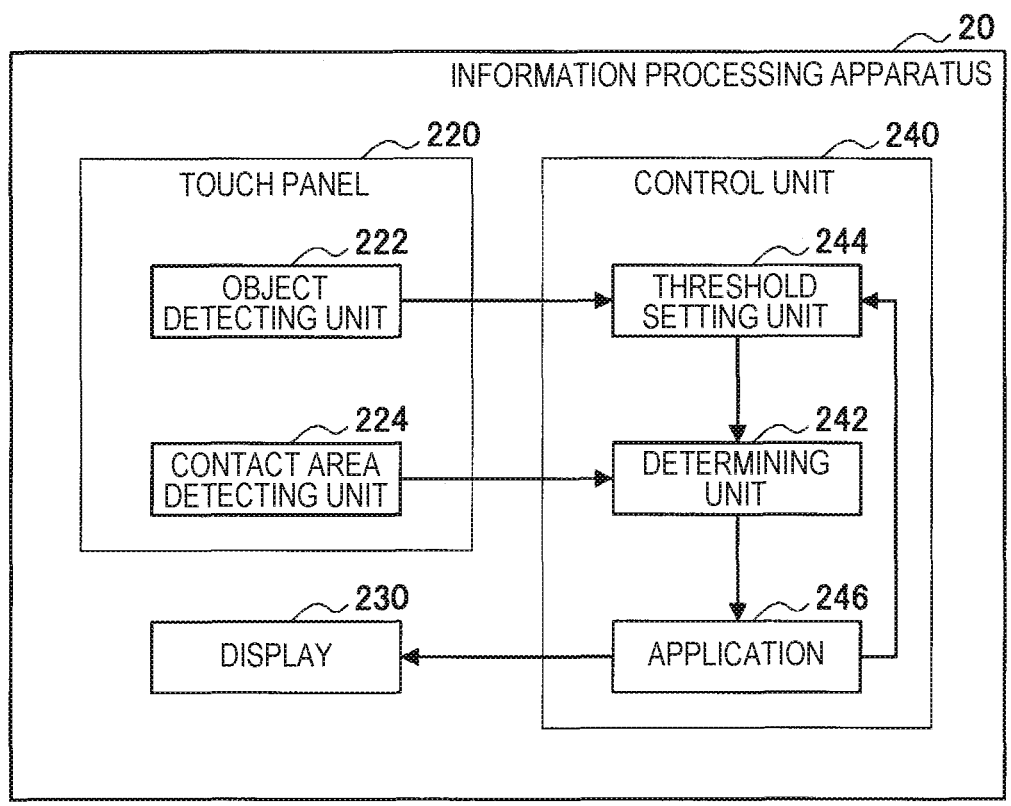
FIG. 2 is a functional block diagram illustrating a configuration of the information processing apparatus 20 according to the embodiment of the present disclosure.

FIG. 2 is a functional block diagram illustrating a configuration of the information processing apparatus 20 according to the embodiment of the present disclosure. As illustrated in FIG. 2, the information processing apparatus 20 has a touch panel 220, a display 230 and a control unit 240.

(Touch Panel)

The touch panel 220 has an object detecting unit 222 and a contact area detecting unit 224.

The object detecting unit 222 detects contact of an object to the operation surface and a contact position. For example, when a plurality of objects such as two fingers contact the operation surface, the object detecting unit 222 detects that the two objects contact the operation surface and the contact positions of the respective objects. Note that the contact position may be a position of the center of gravity in a range where the object contacts the operation surface.

The contact area detecting unit 224 detects an area (contact area) of a range where an object contacts the operation surface. When a plurality of objects contact the operation surface, the contact area detecting unit 224 detects contact areas of the respective objects.

(Display)

The display 230 displays various kinds of display screens according to control from the control unit 240. Particularly, in the present embodiment, application 246 generates a display screen based on input which is determined as valid by a determining unit 242 which will be described later, and the display 230 displays the display screen generated by the application 246.

(Control Unit)

As illustrated in FIG. 2, the control unit 240 has the determining unit 242, a threshold setting unit 244 and the application 246. To the control unit 240, contact information which indicates the number of objects contacting the operation surface, contact positions of the respective objects and contact areas where the respective objects contact the operation surface is supplied from the touch panel 220.

The determining unit 242 which is a configuration for preventing contact of an object other than a specific object such as a finger and a stylus from being erroneously recognized as input by the user, determines whether or not contact of the object is dealt as valid input based on the contact information. Specifically, the determining unit 242 determines contact of an object as valid input or invalid input based on comparison between a contact area of each object and a threshold. For example, the determining unit 242 determines contact of an object as valid input when a contact area of the object is less than or equal to a threshold, and determines contact of an object as invalid input when a contact area of the object exceeds the threshold. The determining unit 242 notifies the application 246 of the contact information regarding contact determined as valid input and does not notify the application 246 of the contact information regarding contact determined as invalid input. According to this configuration, even when an object larger than the finger contacts the operation surface in situations which are not intended by the user, it is possible to prevent contact of the object from being reflected in operation of the application 246.

Note that, when a plurality of objects contact the operation surface, the determining unit 242 may determine contact of all of the plurality of objects as invalid input when a contact area of any of the objects exceeds the threshold, or may determine contact of only an object whose contact area exceeding the threshold as invalid input.

The threshold setting unit 244 dynamically sets the threshold to be used for comparison with the contact area by the determining unit 242. For example, the threshold setting unit 244 can set the threshold according to the number of objects contacting the operation surface, whether or not there is change in the contact position, a type of the application 246, or the like. A threshold setting method by the threshold setting unit 244 will be described in detail in "3. Threshold setting method".

The application 246 performs processing and control according to the contact information supplied from the determining unit 242. The application 246 can include various application such as a web browser, game application, book browsing application, word processing application, and spread sheet application.

3. Threshold Setting Method

The functions of the information processing apparatus 20 according to the embodiment of the present disclosure have been described above. Subsequently, the threshold setting method by the threshold setting unit 244 will be described more specifically.

(3-1. First Setting Method)

The present inventors confirmed that a contact area where the finger contacts the operation surface differs according to operation content during process of research and development. For example, a contact area upon tap operation can be different from a contact area upon operation such as pinch-in and pinch-out. This will be further described with reference to FIG. 3.

Figure 3:
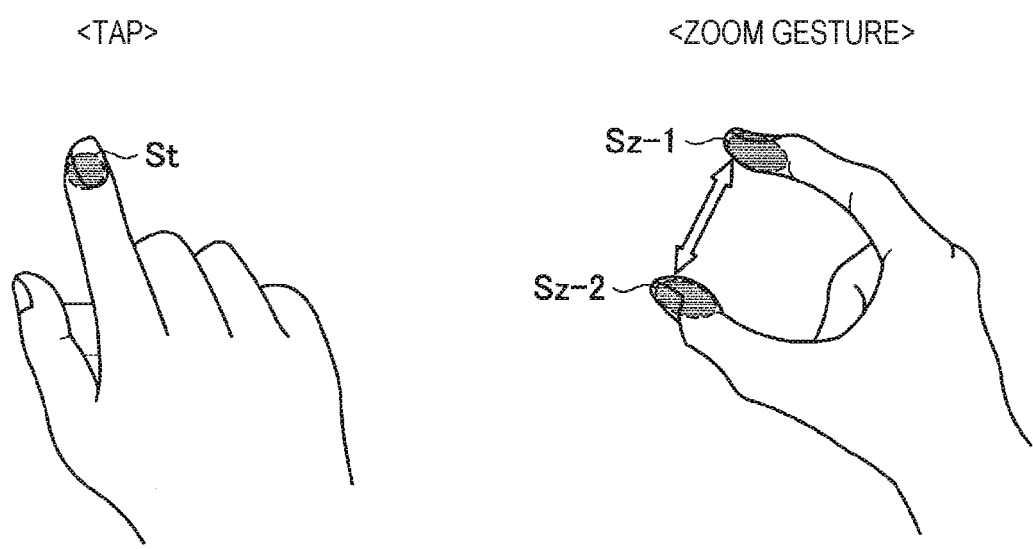
FIG. 3 is an explanatory diagram illustrating relationship between operation content and a contact area.

FIG. 3 is an explanatory diagram illustrating relationship between operation content and a contact area. Zoom gesture using multi-touch, such as pinch-in and pinch-out tends to be performed while the fingers are nearly horizontal with respect to the display 230 compared to tap operation for selecting an object on the display 230 with one finger. Therefore, because while tap operation is performed with a fingertip, zoom gesture using multi-touch is performed with balls of the fingers, as illustrated in FIG. 3, contact areas Sz-1 and Sz-2 upon zoom gesture using multi-touch can be larger than a contact area St upon tap operation.

Therefore, if an area equivalent to a contact area upon tap operation is fixedly set as the threshold, there is a risk that zoom gesture using multi-touch may be determined as invalid input. On the other hand, if the threshold is increased to an area equivalent to a contact area upon zoom gesture, contact of an object other than the finger is more likely to be determined as valid input.

Therefore, the threshold setting unit 244 sets the threshold based on the number of objects contacting the operation surface as a first setting method. For example, when the number of objects contacting the operation surface is two, there is a possibility that the above-described zoom gesture may be performed. Therefore, when the number of objects contacting the operation surface is two, the threshold setting unit 244 may set a higher threshold than that set in the case where the number of objects contacting the operation surface is one. That is, when the number of objects contacting the operation surface is one, the threshold setting unit 244 may set a lower threshold than that set in the case where the number of objects contacting the operation surface is two.

According to this configuration, the determining unit 242 can determine the zoom gesture as valid input, and it is possible to suppress a frequency that contact of an object other than a finger is determined as valid input. Flow of the above-described first threshold setting method will be described below with reference to FIG. 4.

Figure 4:
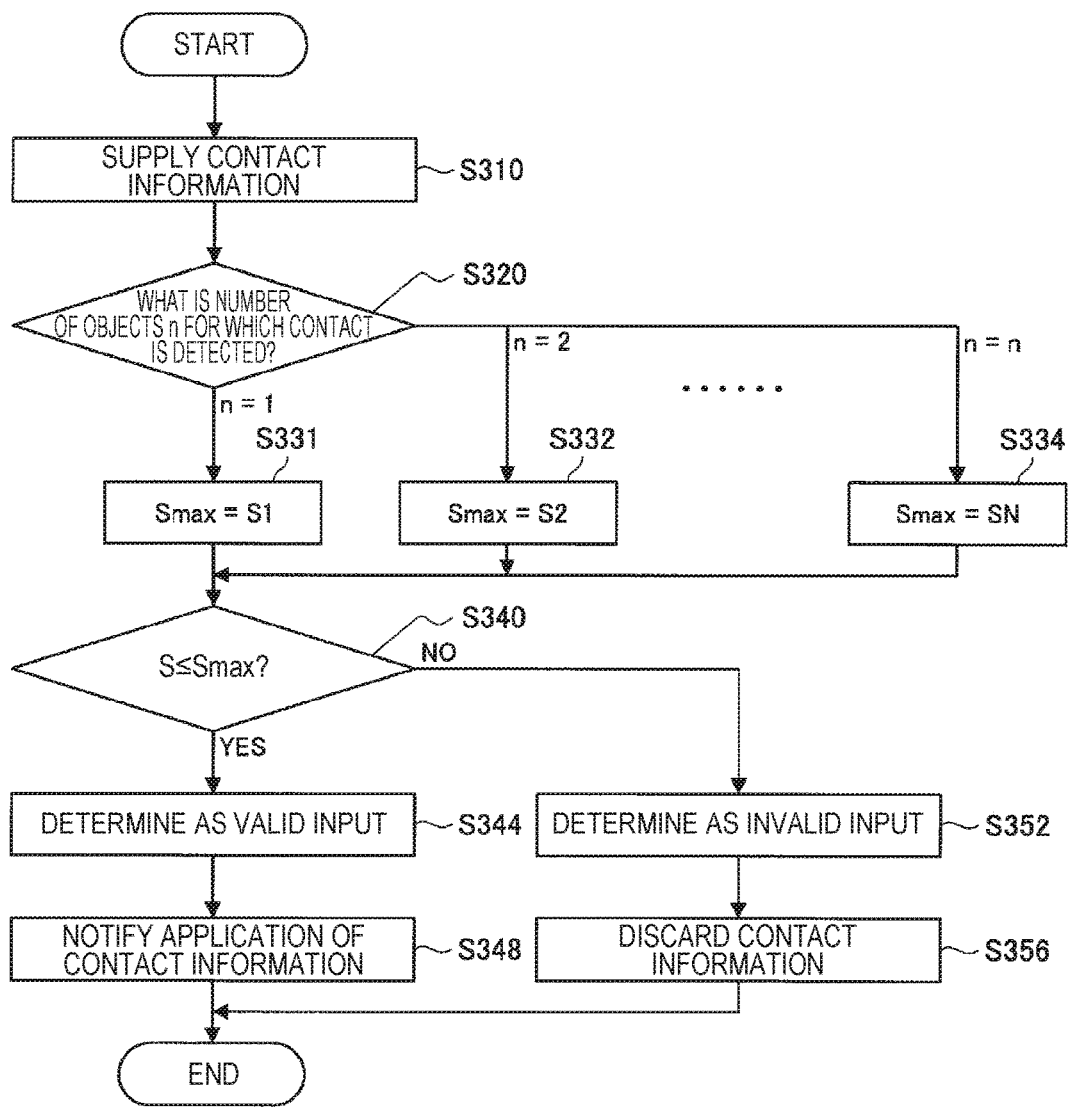
FIG. 4 is a flowchart illustrating flow of a first threshold setting method.

FIG. 4 is a flowchart illustrating the flow of the first threshold setting method. As illustrated in FIG. 4, first, when the contact information is supplied to the control unit 240 from the touch panel 220 (S310), the threshold setting unit 244 confirms the number of objects n for which contact is detected (S320). The threshold setting unit 244 then sets the threshold Smax as S1 when the number of objects n for which contact is detected is 1 (S331). On the other hand, when the number of objects n for which contact is detected is 2, the threshold setting unit 244 sets the threshold Smax as S2 (S332). In a similar manner, when the number n of objects for which contact is detected is N, the threshold setting unit 244 sets the threshold Smax as SN (S334).

Here, the tap operation is single touch operation performed with a fingertip as described with reference to FIG. 3. Therefore, S1 is preferably a smaller value than an area of a typical ball of the finger so that the tap operation is determined as valid input while contact of other objects is less likely to be determined as valid input. On the other hand, the zoom gesture is multi-touch operation performed with balls of the fingers (particularly, a thumb and a forefinger) as described with reference to FIG. 3. Therefore, S2 is preferably a larger value than an area of a typical ball of the thumb so that the zoom gesture is determined as valid input.

Then, the determining unit 242 compares a contact area S of the object with the threshold Smax (S340). When the contact area S of the object is less than or equal to the threshold Smax (S340/Yes), the determining unit 242 determines the contact of the object as valid input (S344) and notifies the application 246 of the contact information (S348).

On the other hand, when the contact area S of the object exceeds the threshold Smax (S340/No), the determining unit 242 determines the contact of the object as invalid input (S352) and discards the contact information (S356).

According to the above determination, because operation intended by the user, such as tap operation and zoom gesture is determined as valid input while contact of an object other than a finger is less likely to be determined as valid input, it is possible to improve determination accuracy for validity of input.

Note that, in the first setting method, as illustrated in FIG. 4, it is also possible to set the threshold Smax also when there are three or more objects for which contact is detected. The threshold Smax in this case may be set according to an input aspect (specification) supported by the application 246 running on the information processing apparatus 20. For example, when the application 246 supports only two-point touch, all of S3 to SN can be set as "0". According to this configuration, when three or more objects contact the operation surface, it is possible to handle contact of all the objects to the operation surface as invalid input.

Further, because zoom gesture tends to be performed with a plurality of balls of fingers, as illustrated in FIG. 3, a difference between the contact area Sz-1 and the contact area Sz-2 is not larger than a difference between the contact area Sz-1 and the contact area St. That is, when a difference between two objects is large, there is a possibility that, for example, contact by tap operation and contact of an object not intended by the user occur instead of zoom gesture being performed. Therefore, when the number of objects contacting the operation surface is two or more, the determining unit 242 may add conditions that a difference between contact areas of respective objects should be less than or equal to a predetermined value to conditions for determining contact of an object as valid input. According to this configuration, further improvement of determination accuracy is expected.

(3-2. Second Setting Method)

As described above, a contact area where a finger contacts the operation surface is different between tap operation performed with single touch and zoom gesture performed with multi-touch. On the other hand, even when the touch is single touch, operation associated with movement of a finger such as scroll operation tends to be performed with a ball of a finger. Therefore, a contact area upon operation associated with movement of a finger such as scroll operation can be larger than a contact area upon operation not associated with movement of a finger such as tap operation.

Therefore, when an area equivalent to the contact area upon tap operation is fixedly set as the threshold, there is a risk that scroll, zoom gesture, or the like may be determined as invalid input. On the other hand, when the threshold is increased to an area equivalent to a contact area upon scroll and zoom gesture, contact of an object other than a finger is more likely to be determined as valid input.

Therefore, as the second setting method, the threshold setting unit 244 sets the threshold based on whether or not there is change in the contact position where the object contacts the operation surface. For example, when the contact position of the object changes, there is a possibility that operation associated with movement of a finger such as scroll operation and zoom gesture as described above is performed. Therefore, when the contact position of the object contacting the operation surface changes, the threshold setting unit 244 may set a higher threshold than that set when the contact position of the object contacting the operation surface does not change.

According to this configuration, it is possible to determine operation associated with movement of a finger such as scroll operation and zoom gesture as valid input, and it is possible to suppress a frequency that contact of an object other than a finger is determined as valid input. Flow of the above-described second threshold setting method will be described below with reference to FIG. 5.

Figure 5:
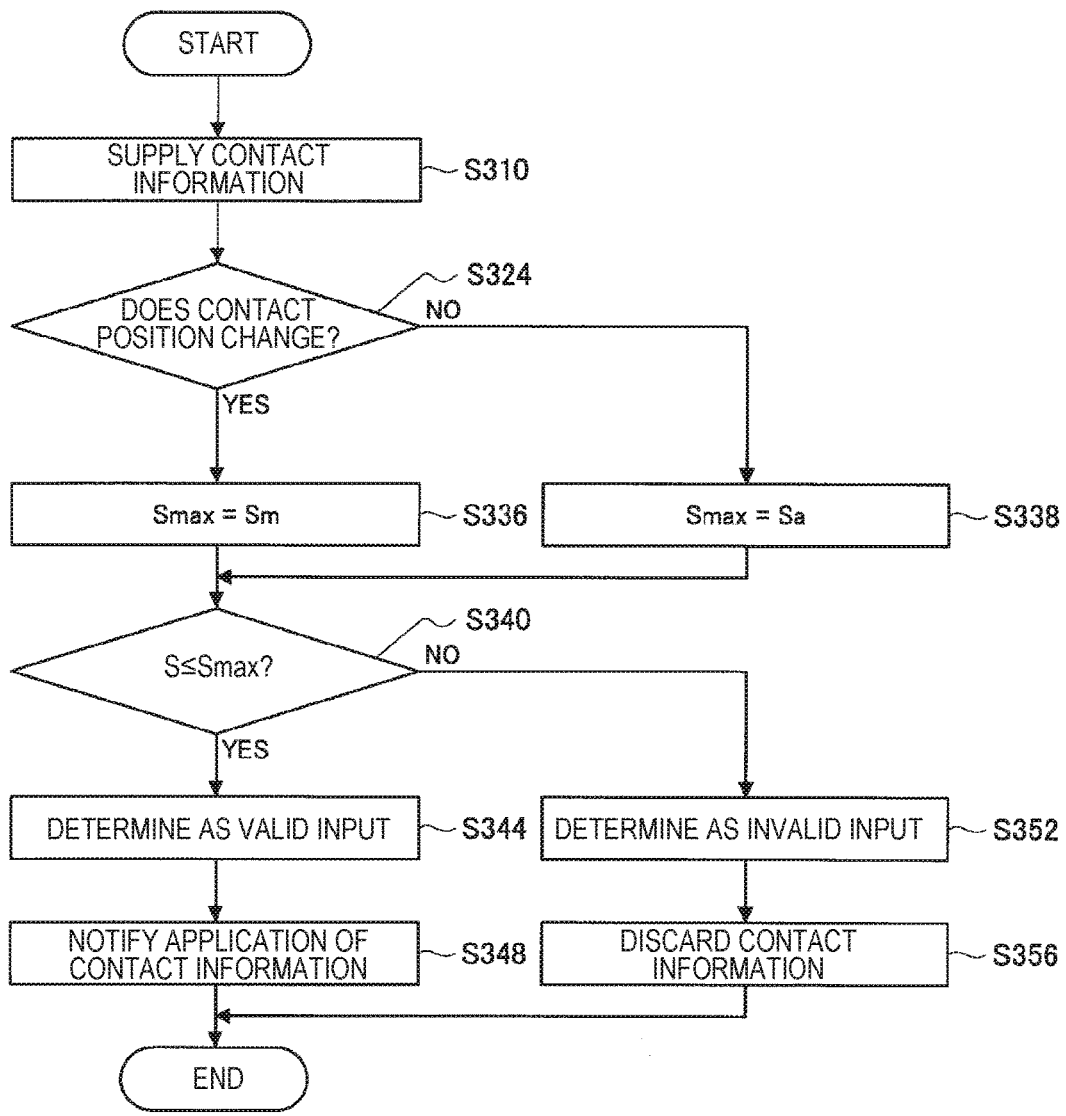
FIG. 5 is a flowchart illustrating flow of a second threshold setting method.

FIG. 5 is a flowchart illustrating the flow of the second threshold setting method. As illustrated in FIG. 5, first, when the contact information is supplied to the control unit 240 from the touch panel 220 (S310), the threshold setting unit 244 confirms whether or not there is change in the contact position of the object (S324). When the contact position of the object changes (S324/Yes), the threshold setting unit 244 sets the threshold Smax as Sm (S336). On the other hand, when the contact position of the object does not change (S324/No), the threshold setting unit 244 sets the threshold Smax as Ss (S338).

Here, as described above, a contact area upon operation not associated with movement of a finger, such as tap operation can be smaller than a contact area upon operation associated with movement of a finger such as scroll operation and zoom gesture. Further, when the contact position of the object does not change, there is a possibility that operation not associated with movement of a finger such as tap operation may be performed. Therefore, Ss which is set as the threshold Smax when the contact position of the object does not change is preferably a smaller value than an area of a typical ball of a finger so that tap operation is determined as valid input while contact of other objects is less likely to be determined as valid input. On the other hand, Sm which is set as the threshold Smax when the contact position of the object changes is preferably a greater value than an area of a typical ball of a thumb so that operation associated with movement of a finger such as scroll operation and zoom gesture is determined as valid input.

Subsequently, the determining unit 242 compares the contact area S of the object with the threshold Smax (S340). When the contact area S of the object is less than or equal to the threshold Smax (S340/Yes), the determining unit 242 determines the contact of the objet as valid input (S344) and notifies the application 246 of the contact information (S348).

On the other hand, when the contact area S of the object exceeds the threshold Smax (S340/No), the determining unit 242 determines the contact of the object as invalid input (S352) and discards the contact information (S356).

According to the above-described determination, because operation intended by the user is determined as valid input and contact of an object other than a finger is less likely to be determined as valid input, it is possible to improve determination accuracy for validity of input.

(3-3. Third Setting Method)

As described above, the contact area where the finger contacts the operation surface tends to be different according to operation content by the user. On the other hand, the operation content of the user can be biased according to a type of the application 246 being used by the user. For example, the operation content is mainly tap operation in game application in which the user performs tap operation to the rhythm, while the operation content is mainly "tracing operation" of moving the finger on the operation surface in a game in which the user performs operation of linking panels of the same type.

Therefore, the threshold setting unit 244 sets the threshold based on the type of the application 246 being used by the user as the third setting method. Flow of such a second threshold setting method will be described below with reference to FIG. 6.

Figure 6:
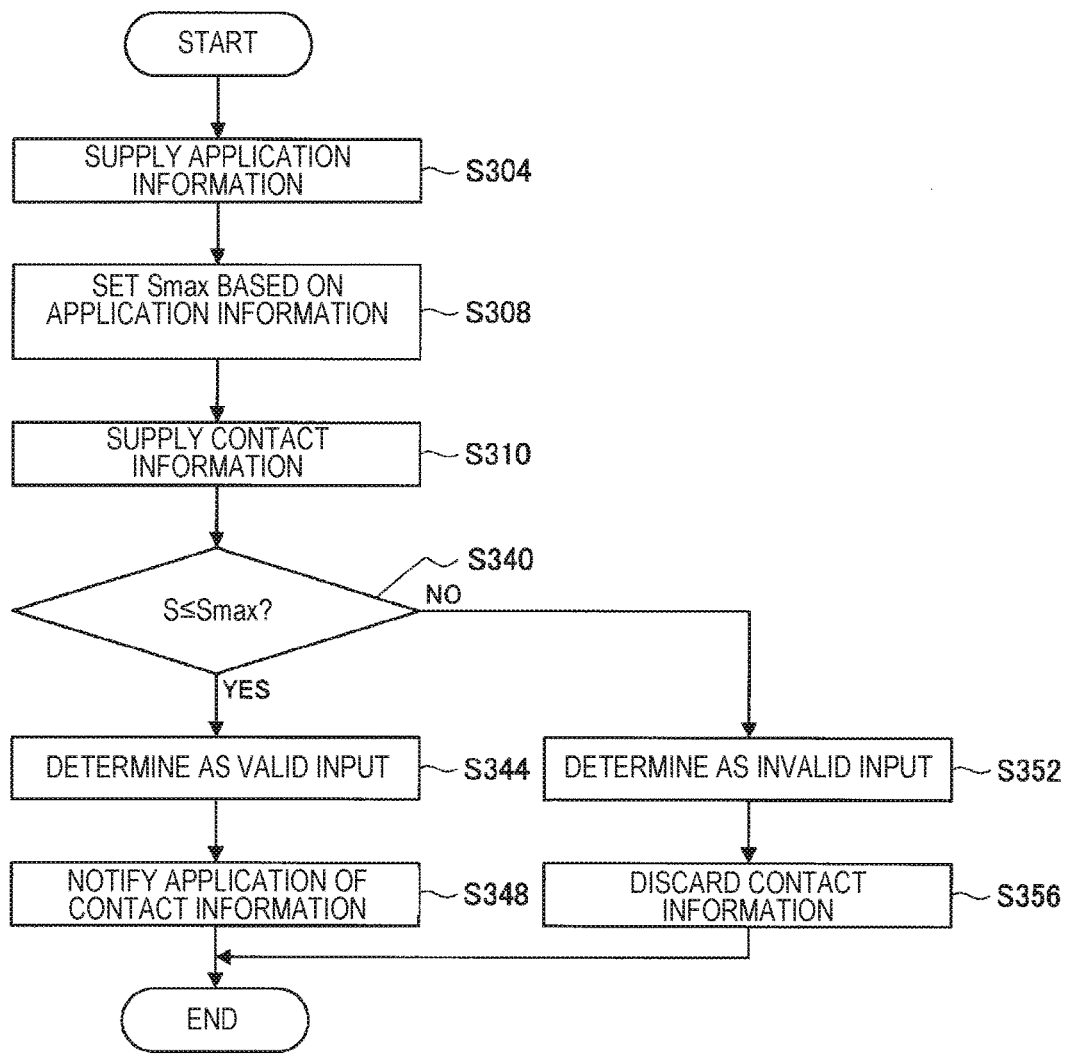
FIG. 6 is a flowchart illustrating flow of a third threshold setting method.

FIG. 6 is a flowchart illustrating the flow of the third threshold setting method. As illustrated in FIG. 6, first, when the threshold setting unit 244 acquires application information from the application 246 (S304), the threshold setting unit 244 sets the threshold Smax based on the application information (S308). Here, the application information may include information indicating a type of application, operation mainly used in the application or a contact area to be set as the threshold Smax.

Subsequently, when the contact information is supplied to the control unit 240 from the touch panel 220 (S310), the determining unit 242 compares the contact area S of the object with the threshold Smax (S340). When the contact area S of the object is less than or equal to the threshold Smax (S340/Yes), the determining unit 242 determines the contact of the object as valid input (S344) and notifies the application 246 of the contact information (S348).

On the other hand, when the contact area S of the object exceeds the threshold Smax (S340/No), the determining unit 242 determines the contact of the object as invalid input (S352) and discards the contact information (S356).

According to the above operation, because operation which is highly likely to be performed for operation of the application 246 is more likely to be determined as valid input, it is possible to accurately reflect user's intension in the operation of the application 246.

4. Hardware Configuration

The embodiment of the present disclosure has been described above. The above-described information processing such as threshold setting and input determination is realized with coordination of software and hardware of the information processing apparatus 20 which will be described below.

Figure 7:
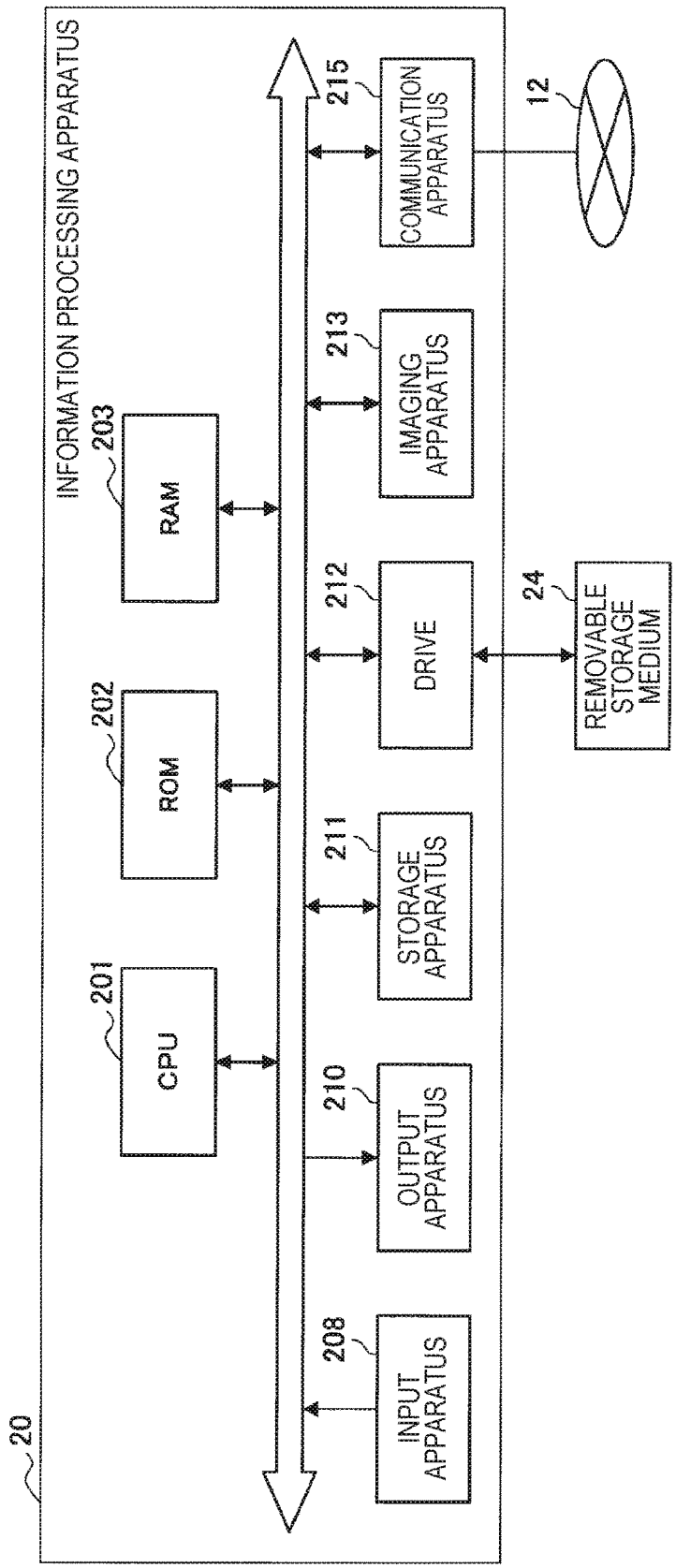
FIG. 7 is an explanatory diagram illustrating a hardware configuration of the information processing apparatus.

FIG. 7 is an explanatory diagram illustrating a hardware configuration of the information processing apparatus 20. As illustrated in FIG. 7, the information processing apparatus 20 includes a central processing unit (CPU) 201, a read only memory (ROM) 202, a random access memory (RAM) 203, an input apparatus 208, an output apparatus 210, a storage apparatus 211, a drive 212, an imaging apparatus 213 and a communication apparatus 215.

The CPU 201, which functions as an arithmetic processing apparatus and a control apparatus, controls the whole operation within the information processing apparatus 20 according to various kinds of programs. Further, the CPU 201 may be a microprocessor. The ROM 202 stores a program, an operation parameter, or the like, used by the CPU 201. The RAM 203 temporarily stores a program used in execution of the CPU 201, a parameter which changes as appropriate in the execution, or the like. These are connected to one another through a host bus configured with a CPU bus, or the like. Each function of the control unit 240 described above can be realized with coordination of these CPU 201, the ROM 202 and the RAM 203.

The input apparatus 208 is configured with input means such as a mouse, a keyboard, a touch panel, a button, a microphone and a switch, through which the user inputs information, an input control circuit which generates an input signal based on input by the user and outputs the input signal to the CPU 201, or the like. The user of the information processing apparatus 20 can input various kinds of data to the information processing apparatus 20 and instructs the information processing apparatus 20 to perform processing operation by manipulating the input apparatus 208.

The output apparatus 210 includes, for example, a liquid crystal display (LCD) apparatus, an organic light emitting diode (OLED) apparatus and a display apparatus such as a lamp. Further, the output apparatus 210 includes a sound output apparatus such as a speaker and a headphone. For example, the display apparatus displays an imaged image, a generated image, or the like. Meanwhile, the sound output apparatus converts sound data, or the like, into sound and outputs the sound.

The storage apparatus 211 is an apparatus for data storage configured as one example of a storage unit of the information processing apparatus 20 according to the present embodiment. The storage apparatus 211 may include a storage medium, a recording apparatus which records data in the storage medium, a readout apparatus which reads out data from the storage medium, a deleting apparatus which deletes data recorded in the storage medium, or the like. This storage apparatus 211 stores a program to be executed by the CPU 201 and various kinds of data.

The drive 212, which is a reader/writer for storage medium, is incorporated into the information processing apparatus 20 or externally attached to the information processing apparatus 20. The drive 212 reads out information recorded in a removable storage medium 24 such as a magnetic disk, an optical disk, a magnetooptical disk and a semiconductor memory, which is being loaded, and outputs the information to the RAM 203. Further, the drive 212 can write information in the removable storage medium 24.

The imaging apparatus 213 includes an imaging optical system such as a shooting lens which collects light and a zoom lens, and a signal conversion device such as a charge coupled device (CCD) and a complementary metal oxide semiconductor (CMOS). The imaging optical system collects light emitted from a subject to form a subject image at a signal converting unit, and the signal conversion device converts the formed subject image into an electrical image signal.

The communication apparatus 215 is, for example, a communication interface configured with a communication device, or the like, for being connected to a network 12. Further, the communication apparatus 215 may be a wireless local area network (LAN)-enabled communication apparatus, a long term evolution (LTE)-enabled communication apparatus, or a wire communication apparatus which performs communication in a wired manner.

Note that the network 12 is a wired or wireless transmission path through which information is transmitted from an apparatus connected to the network 12. For example, the network 12 may include a public line such as the Internet, a telephone network and a satellite communication network, various kinds of local area networks (LAN) including Ethernet (registered trademark), wide area network (WAN), or the like. Further, the network 12 may include a private network such as an internet protocol-virtual private network (IP-VPN), or the like.

5. Conclusion

As described above, according to the embodiment of the present disclosure, it is possible to improve determination accuracy for validity of input by dynamically setting a threshold for a contact area for determining validity of input.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, each step in the processing of the information processing apparatus 20 of the present specification is not necessarily required to be performed in time series along the order described in the flowcharts. For example, each step in the processing of the information processing apparatus 20 may be performed in order different from the order described in the flowcharts or may be performed in parallel.

Further, it is also possible to create a computer program for making hardware such as the CPU 201, the ROM 202 and the RAM 203 incorporated into the information processing apparatus 20 exert functions equivalent to those of each configuration of the above-described information processing apparatus 20. Further, a storage medium which stores the computer program therein is also provided.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including:

an operation detecting unit configured to detect a contact area where each of one or two or more objects contacting an operation surface contacts the operation surface;

a determining unit configured to determine contact between the object and the operation surface as valid input or invalid input based on comparison between the contact area and a threshold; and a threshold setting unit configured to dynamically set the threshold.

(2)

The information processing apparatus according to (1), wherein the determining unit determines contact between the object and the operation surface as valid input when the contact area is less than or equal to the threshold.

(3)

The information processing apparatus according to (1) or (2), wherein the operation detecting unit further detects the number of objects contacting the operation surface, and the threshold setting unit sets the threshold based on the number of objects.

(4)

The information processing apparatus according to (3), wherein, when the number of objects is two, the threshold setting unit sets a threshold higher than a threshold set in the case where the number of objects is one.

(5)

The information processing apparatus according to any one of (2) to (4), wherein, when two or more objects contact the operation surface, when contact areas of the respective objects are each less than or equal to the threshold and a difference in the contact areas of the respective objects is less than or equal to a predetermined value, the determining unit determines contact between the object and the operation surface as valid input.

(6)

The information processing apparatus according to (1) or (2), wherein the operation detecting unit further detects a contact position where the object contacts the operation surface, and the threshold setting unit sets the threshold based on whether or not there is change in the contact position.

(7)

The information processing apparatus according to (6), wherein, when the contact position changes, the threshold setting unit sets a threshold higher than a threshold set in the case where the contact position does not change.

(8)

The information processing apparatus according to (1) or (2), wherein the threshold setting unit sets the threshold based on an application being utilized by a user.

(9)

An information processing method including:

detecting a contact area where each of one or two or more objects contacting an operation surface contacts the operation surface;

determining by a processor contact between the object and the operation surface as valid input or invalid input based on comparison between the contact area and a threshold; and dynamically setting the threshold.

(10)

A program causing a computer to execute:

detecting a contact area where each of one or two or more objects contacting an operation surface contacts the operation surface;

determining contact between the object and the operation surface as valid input or invalid input based on comparison between the contact area and a threshold; and dynamically setting the threshold.

REFERENCE SIGNS LIST

20 information processing apparatus
220 touch panel
222 object detecting unit
224 contact area detecting unit
230 display
240 control unit
242 determining unit
244 threshold setting unit
246 application

The invention claimed is:

1. An information processing apparatus comprising:
an operation detecting unit configured to detect a contact area where each of one or two or more objects contacting an operation surface contacts the operation surface;
a determining unit configured to determine contact between the object and the operation surface as valid input or invalid input based on comparison between the contact area and a threshold; and a threshold setting unit configured to dynamically set the threshold, wherein the operation detecting unit further detects a contact position where the object contacts the operation surface, and the threshold setting unit sets the threshold based on whether or not there is change in the contact position.

2. The information processing apparatus according to claim 1, wherein the determining unit determines contact between the object and the operation surface as valid input when the contact area is less than or equal to the threshold.

3. The information processing apparatus according to claim 2, wherein, when two or more objects contact the operation surface, when contact areas of the respective objects are each less than or equal to the threshold and a difference in the contact areas of the respective objects is less than or equal to a predetermined value, the determining unit determines contact between the object and the operation surface as valid input.

4. The information processing apparatus according to claim 1, wherein the operation detecting unit further detects the number of objects contacting the operation surface, and the threshold setting unit sets the threshold based on the number of objects.

5. The information processing apparatus according to claim 4, wherein, when the number of objects is two, the threshold setting unit sets a threshold higher than a threshold set in the case where the number of objects is one.

6. The information processing apparatus according to claim 1, wherein, when the contact position changes, the threshold setting unit sets a threshold higher than a threshold set in the case where the contact position does not change.

7. The information processing apparatus according to claim 1, wherein the threshold setting unit sets the threshold based on an application being utilized by a user.

8. An information processing method comprising:

detecting a contact area and a contact position where an objects contacting an operation surface contacts the operation surface;

determining by a processor contact between the object and the operation surface as valid input or invalid input based on comparison between the contact area and a threshold; and dynamically setting the threshold based on whether or not there is change in the contact position.

9. A non-transitory storage medium storing a program causing a computer to execute:

detecting a contact area and a contact position where an objects contacting an operation surface contacts the operation surface;

determining contact between the object and the operation surface as valid input or invalid input based on comparison between the contact area and a threshold; and dynamically setting the threshold based on whether or not there is change in the contact position.

* * * * *